(12) United States Patent
Oh et al.

(10) Patent No.: US 8,405,769 B2
(45) Date of Patent: Mar. 26, 2013

(54) METHODS AND SYSTEMS FOR SHORT RANGE MOTION COMPENSATION DE-INTERLACING

(75) Inventors: Jong Dae Oh, Folsom, CA (US); Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 376 days.

(21) Appl. No.: 12/644,463

(22) Filed: Dec. 22, 2009

(65) Prior Publication Data

US 2011/0149151 A1    Jun. 23, 2011

(51) Int. Cl.
*H04N 7/01* (2006.01)
(52) U.S. Cl. ...................................... 348/441
(58) Field of Classification Search .................. 348/452, 348/441, 448, 450–451, 458, 459
See application file for complete search history.

(56) References Cited

U.S. PATENT DOCUMENTS

| | | | |
|---|---|---|---|
| 6,459,455 B1 | 10/2002 | Jiang et al. | |
| 6,532,264 B1* | 3/2003 | Kahn | 375/240.16 |
| 6,639,944 B1* | 10/2003 | De Haan et al. | 375/240.17 |
| 6,940,557 B2* | 9/2005 | Handjojo et al. | 348/452 |
| 7,116,372 B2* | 10/2006 | Kondo et al. | 348/448 |
| 7,499,494 B2* | 3/2009 | Nair et al. | 375/240.16 |
| 7,683,971 B2* | 3/2010 | Han et al. | 348/452 |
| 7,944,503 B1* | 5/2011 | Zhai et al. | 348/452 |
| 8,144,778 B2* | 3/2012 | Jia et al. | 375/240.16 |
| 2002/0047919 A1 | 4/2002 | Kondo et al. | |
| 2005/0179814 A1* | 8/2005 | Pau et al. | 348/448 |
| 2007/0291843 A1 | 12/2007 | Chappalli et al. | |
| 2010/0039556 A1* | 2/2010 | Au et al. | 348/452 |
| 2010/0045862 A1* | 2/2010 | Burns et al. | 348/452 |

FOREIGN PATENT DOCUMENTS

| | | |
|---|---|---|
| CN | 1477870 A | 2/2004 |
| EP | 1387577 A2 | 2/2004 |
| EP | 1761045 A2 | 3/2007 |
| EP | 1761045 A3 | 10/2008 |
| EP | 1387577 A3 | 9/2010 |
| GB | 2277004 A | 10/1994 |
| KR | 10-2001-0026089 A | 4/2001 |

(Continued)

OTHER PUBLICATIONS

Combined Search and Examination Report received for United Kingdom Patent Application No. GB1019700.2, mailed on Mar. 14, 2011, 7 pages.

(Continued)

*Primary Examiner* — Paulos M Natnael
(74) *Attorney, Agent, or Firm* — Garrett IP, LLC (57) ABSTRACT

Systems and methods for choosing whether to select either a spatial interpolation value or a motion compensation interpolation value for deinterlacing an interlaced frame. A minimal sum of absolute differences (SAD) may be determined for a current pixel. Depending on the magnitude of the minimal SAD relative to two threshold values, different checks may be applied. The outcome of the checks may determine whether the spatial interpolation value or the motion compensation interpolation value may be used in deinterlacing. Generally, the magnitude of the minimal SAD may determine the reliability of the SAD and the consequent trustworthiness of the associated motion vector (MV). Greater reliability of the minimal SAD may suggest that the motion compensation interpolation value may be used for purposes of deinterlacing. Less reliability in the minimal SAD may motivate additional checks to further evaluate whether the motion compensation interpolation value should be used. A less reliable minimal SAD and/or failure of some of the checks may suggest that the motion compensation interpolation value should not be used.

27 Claims, 6 Drawing Sheets

FOREIGN PATENT DOCUMENTS

KR   10-2009-0020134 A   2/2009

OTHER PUBLICATIONS

Notice of Allowance Received for Korean Patent Application No. 10-2010-0132784, mailed on Aug. 24, 2012, 2 pages of Notice of Allowance and 1 pages Of English Translation.

Examination Report received for United Kingdom Patent application No. 1019700.2, mailed on Aug. 21, 2012, 3 pages.

Office Action Received for Chinese Patent Application No. 201010620740.7, mailed on Nov. 23, 2012. 13 pages.

\* cited by examiner

METHODS AND SYSTEMS FOR SHORT RANGE MOTION COMPENSATION DE-INTERLACING

RELATED APPLICATIONS

The following description is related to the following pending applications:

Motion Detection For Video Processing, U.S. application Ser. No. 11/614,021, filed on Dec. 20, 2006.

Method and Apparatus For An Angular-Directed Spatial Deinterlacer, U.S. application Ser. No. 11/646,763, filed on Dec. 27, 2006.

Motion Adaptive Upsampling Of Chroma Video Signals, U.S. application Ser. No. 11/705,721, filed on Feb. 12, 2007.

BACKGROUND

Video may consist of a series of images shown in rapid succession. Each image may represent a frame. Some systems, such as traditional television systems, may divide each image into a series of scan lines. Some conventional analog and digital television systems arrange the scan lines of each frame into two consecutive fields, one containing all even lines, and one containing the odd lines. The fields are displayed in succession at twice the rate of the nominal frame rate.

In video generated by traditional television and video cameras, the two fields of a frame may be taken at slightly different times, which results in an effectively doubled time resolution as compared with non-interlaced video, improving the viewer's motion perception.

These benefits can only be experienced if the display shows the individual fields in the same order in which they were shot. Generally, only traditional cathode ray tube (CRT)-based televisions and monitors may be capable of doing so. If correctly adjusted, they may not suffer from interlacing artifacts. But when the fields of the original footage are displayed in a different order from the order in which they were shot (i.e. when two fields taken at different points in time are re-combined to one frame), visual defects, such as interlace artifacts or combing, may occur with moving objects in the image.

Display technology has evolved from cathode ray tubes that generate images using interlaced scans, to flat digital display devices that generate images using progressive scan. To handle interlace artifacts, liquid crystal display (LCD) and plasma consumer television sets and monitors may include circuitry and/or software that converts interlaced video into progressive video. The process of converting interlaced video into progressive video is called de-interlacing.

Deinterlacing, if done poorly, can introduce image degradation. Conventional deinterlacing algorithms may be divided by two categories: intra-field processing and inter-field processing. Intra-field processing may use a relatively simple algorithm; however, such an algorithm cannot overcome the loss of vertical resolution. An algorithm in the category of inter-filed algorithms is the weave, which may result in noticeable artifacts, especially around moving areas. Other inter-field algorithms, such as motion adaptive (MA) and motion compensation (MC) algorithms may yield better results than the intra-field algorithms, but do not always provide optimal results.

DETAILED DESCRIPTION

The following describes systems and methods for choosing whether to select either a spatial interpolation value or a motion compensation interpolation value for deinterlacing an interlaced frame. A minimal sum of absolute differences (SAD) may be determined for a current pixel, where the minimal SAD may be the smallest SAD in a set of SADs that may be calculated for a respective set of motion vectors between the current pixel and a reference frame. Depending on the magnitude of the minimal SAD relative to two threshold values, different checks may be applied. The outcome of the checks may determine whether the spatial interpolation value or the motion compensation interpolation value may be used in deinterlacing. Generally, the magnitude of the minimal SAD may determine the reliability of the SAD and the consequent trustworthiness of the associated motion vector (MV). Greater reliability of the minimal SAD may suggest that the motion compensation interpolation value may be used for purposes of deinterlacing. Less reliability in the minimal SAD may motivate additional checks to further evaluate whether the motion compensation interpolation value should be used. A less reliable minimal SAD and/or failure of some of the checks may suggest that the motion compensation interpolation value should not be used. If this is the case, then the spatial interpolation value may be the better choice for deinterlacing.

Generally, several processes can be used to derive a SAD. In an embodiment, the SAD can be determined according to the following:

$$SAD = \sum_{i=x-w}^{x+w+1} \sum_{j=y-h}^{y+h} |p_{ref}(i + M_x, j + M_y) - p_{curr}(i, j)|$$

Here, $p_{ref}$ may refer to the intensity of the pixel at the indicated coordinates in the opposite field in a reference frame, $p_{curr}$ may refer to the intensity of the pixel at the indicated coordinates in the opposite field in the current frame (where the current pixel may reside). $M_x$ and $M_y$ may be the x and y components of the putative motion vector, and w and h may refer to width and height of the current frame.

Figure 1:
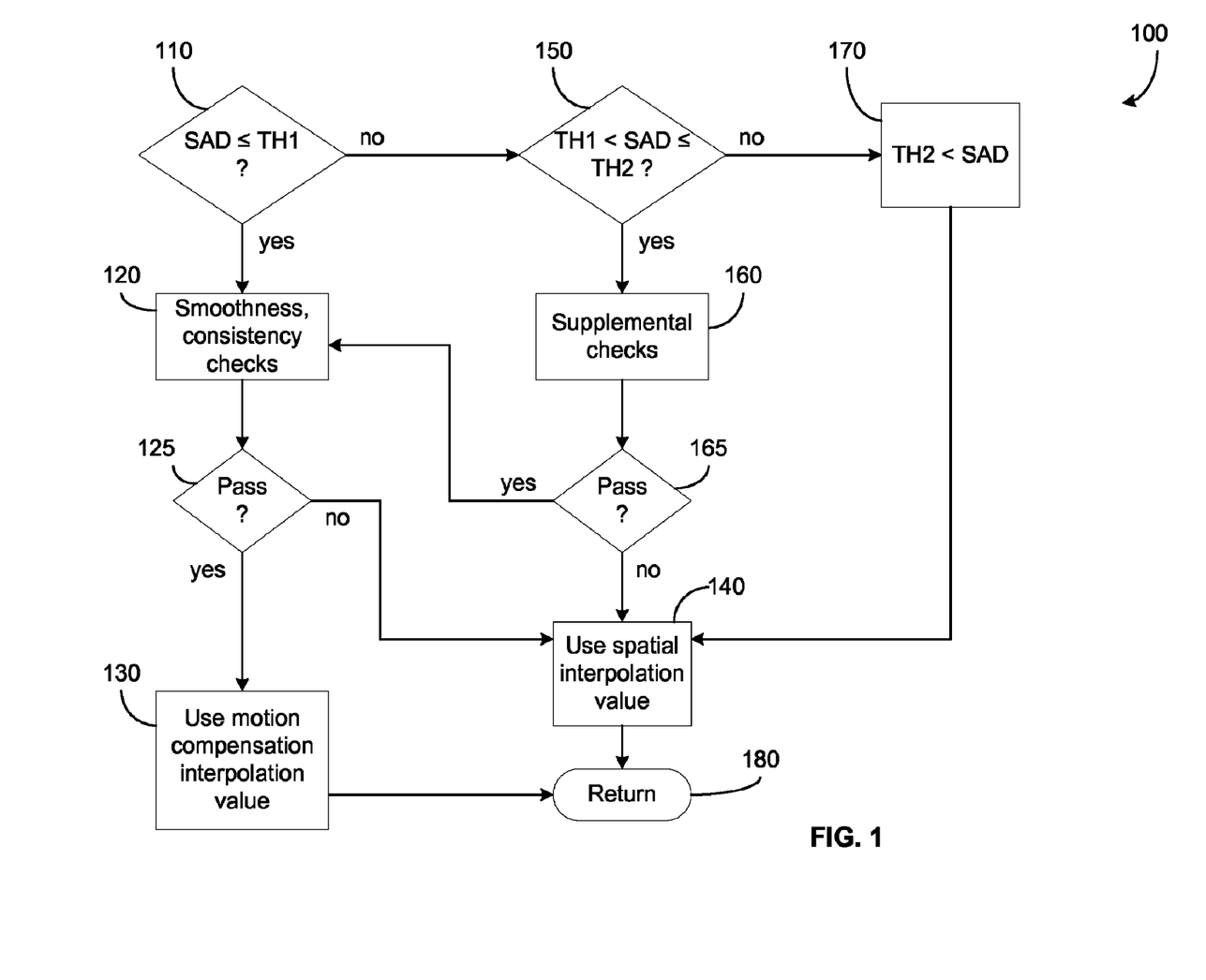
FIG. 1 illustrates the overall processing of an embodiment.

Processing using the SAD is illustrated in FIG. 1, according to an embodiment. At 110, a determination may be made as to whether the minimal SAD is less than or equal to a first threshold value, shown as TH1. In an embodiment, TH1 may be set to zero. If the minimal SAD is less than or equal to TH1, then this SAD may be considered to be reliable, so that only minimum robustness checks may be necessary before allowing the use of a motion compensation interpolation value for deinterlacing. As a result, the process may continue to 120, where two checks may be performed, a smoothness check and a consistency check. These will be described in greater detail below. In general, the smoothness check may consider the quality of the motion vector associated with the minimal SAD, by comparing this MV with MVs of neighboring pixels. Similarity may suggest smoothness, i.e., similarity among neighboring pixels with respect to their respective MVs. The consistency check measures the similarity of a compensated pixel pair with respect to spatial and temporal interpolations. If both checks are passed, as determined at 125, then at 130 a motion compensation interpolation value may be used for deinterlacing of the interlaced frame.

If, at 125, it is determined that either the smoothness check or the consistency check has been failed, then the minimal SAD may be less reliable than initially thought. The process may therefore continue at 140, where a spatial interpolation value may be used for deinterlacing the interlaced frame.

If, at 110, it is determined that the minimal SAD is not less than or equal to TH1, then a determination may be made at 150 as to whether this SAD is greater than TH1 but less than or equal to a second threshold value TH2. In an embodiment, TH2 may be a value between five and ten. Given that the minimal SAD is between TH1 and TH2, the SAD may be considered to be somewhat less reliable. As a result, supplemental checks may be applied in addition to the smoothness and consistency checks before the use of the motion compensation interpolation value may be used. Failure of any of these checks may result in the use of the spatial interpolation value instead.

If the minimal SAD is greater than TH1 and less than or equal to TH2, then supplemental checks may be performed at 160. These supplemental checks will be described in greater detail below. If the supplemental checks are passed (as determined at 165), then the process may continue at 120, where the smoothness and consistency checks may be performed. If these latter checks are passed (as determined at 125), then the minimal SAD may be considered to be somewhat reliable, and the motion compensation interpolation value may be used for deinterlacing at 130. If either the smoothness or consistency check is failed at 125, then the spatial interpolation value may be used for deinterlacing at 140. Moreover, if any of the supplemental checks are failed (as determined at 165), then the spatial interpolation value may be used for deinterlacing at 140.

When the minimal SAD is greater than TH2 (at 170), then this SAD may be considered to be unreliable. As a result, the spatial interpolation value may be used for deinterlacing the interlaced frame at 140. The process may conclude at 180.

Figure 2:
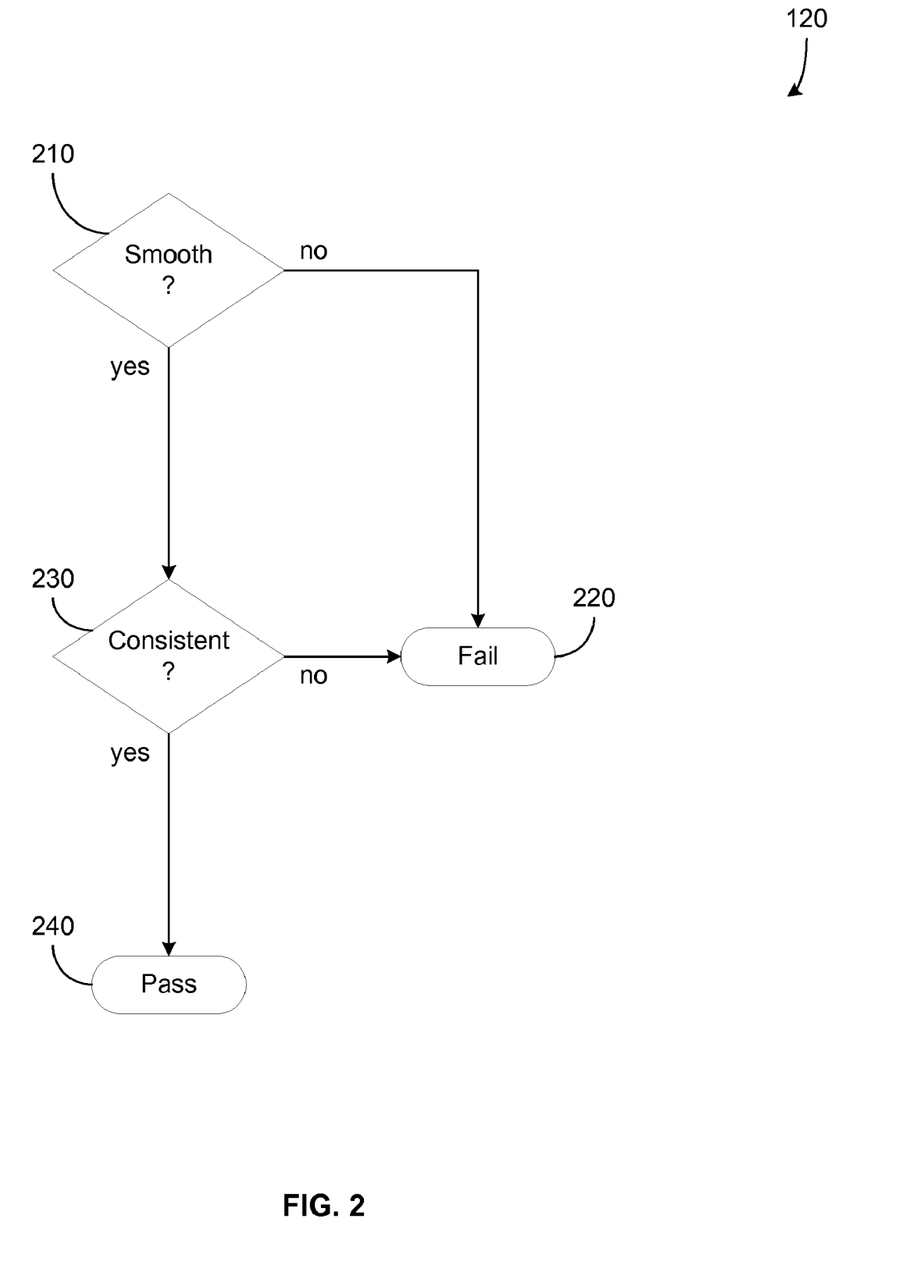
FIG. 2 is a flow chart illustrating smoothness and consistency checks, according to an embodiment.

The processing of the smoothness and consistency checks is illustrated in FIG. 2, according to an embodiment. At 210, the smoothness check may be performed. As discussed above, this may include consideration of the MVs of the neighboring pixels and whether they are similar to the MV associated with the minimal SAD. Lack of similarity may result in failure of the smoothness check, as indicated at 220. If there is sufficient similarity, the process may continue at 230.

At 230, the consistency check may be performed. As discussed above, this may include assessing the consistency of a compensated pixel pair with respect to spatial and temporal interpolations. Consistency results in a passing state, shown at 240. Lack of consistency may result in failure, shown at 220. Note that the failure state 220 may be reached if either the smoothness or consistency checks fails. Both the smoothness and consistency have to be present before the passing state 240 may be reached. Note also that while the smoothness check 210 is shown occurring before the consistency check 230, these checks may be reversed in an alternative embodiment.

Figure 3:
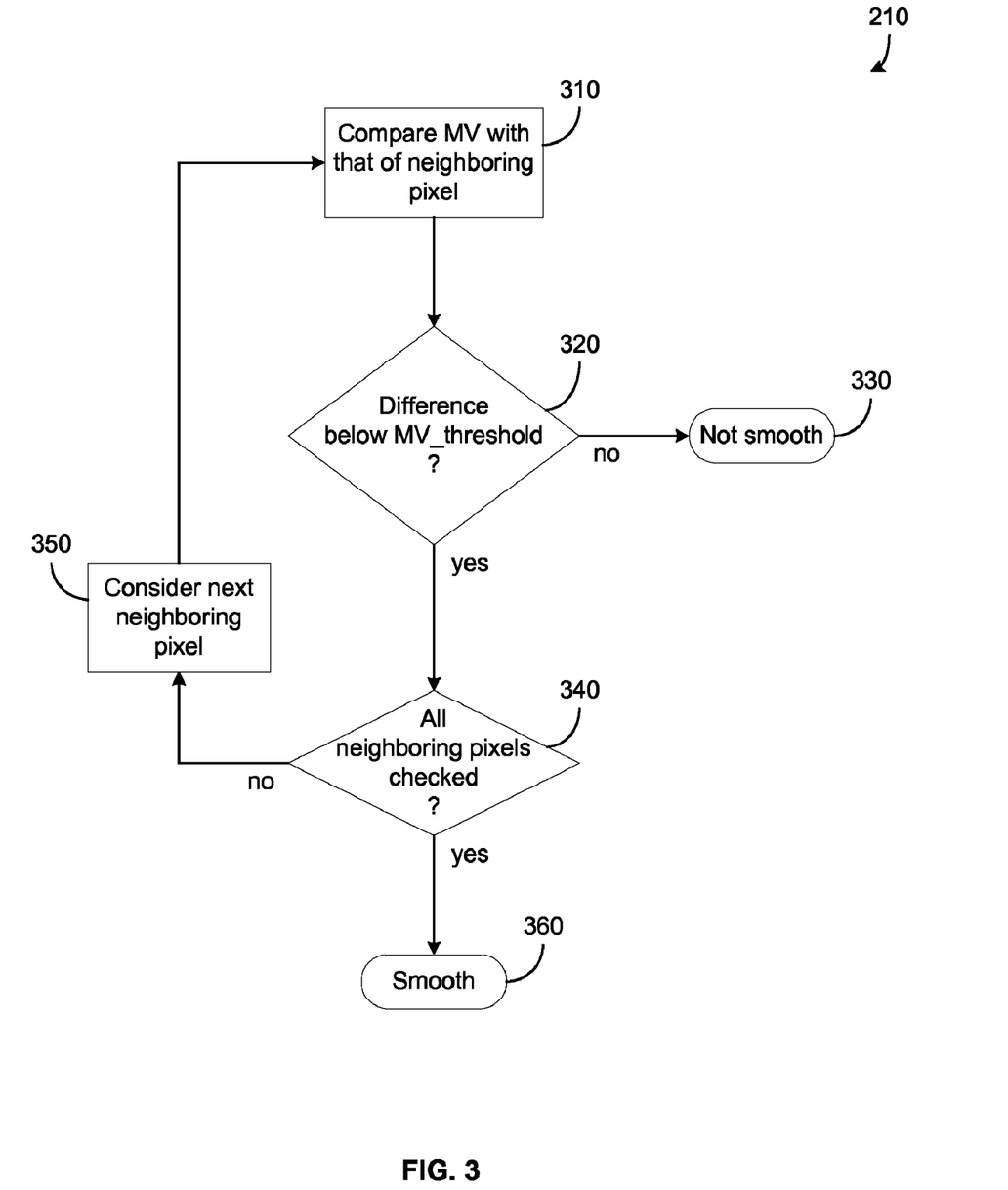
FIG. 3 is a flow chart illustrating the processing of the smoothness check, according to an embodiment.

The smoothness check 220 is shown in greater detail in FIG. 3, according to an embodiment. At 310, for the current pixel in the interlaced frame, the MV associated with the minimal SAD may be compared with the MV of a neighboring pixel. At 320, a determination may be made as to whether the difference between the two MVs is less than a threshold value, shown here as MV_threshold. If not, then the neighborhood surrounding the current pixel may be designated at 330 as not smooth.

If the difference is below MV_threshold, then a determination may be made at 340 as to whether all neighboring pixels have been checked. If not, then the next neighboring pixel may be considered at 350, and the test of 310 and 320 may be repeated for this next pixel. The loop may continue until all neighboring pixels have been considered. Once a neighboring pixel is found with an MV such that this MV and the minimal MV of the current pixel differ by more than MV_threshold, then the neighborhood surrounding the current pixel may be designated at 330 as not smooth. If all neighboring pixels have been checked, and none is found having an MV such that this MV and the minimal MV of the current pixel differ by more than MV_threshold, then a designation of smoothness may be made at 360.

Figure 4:
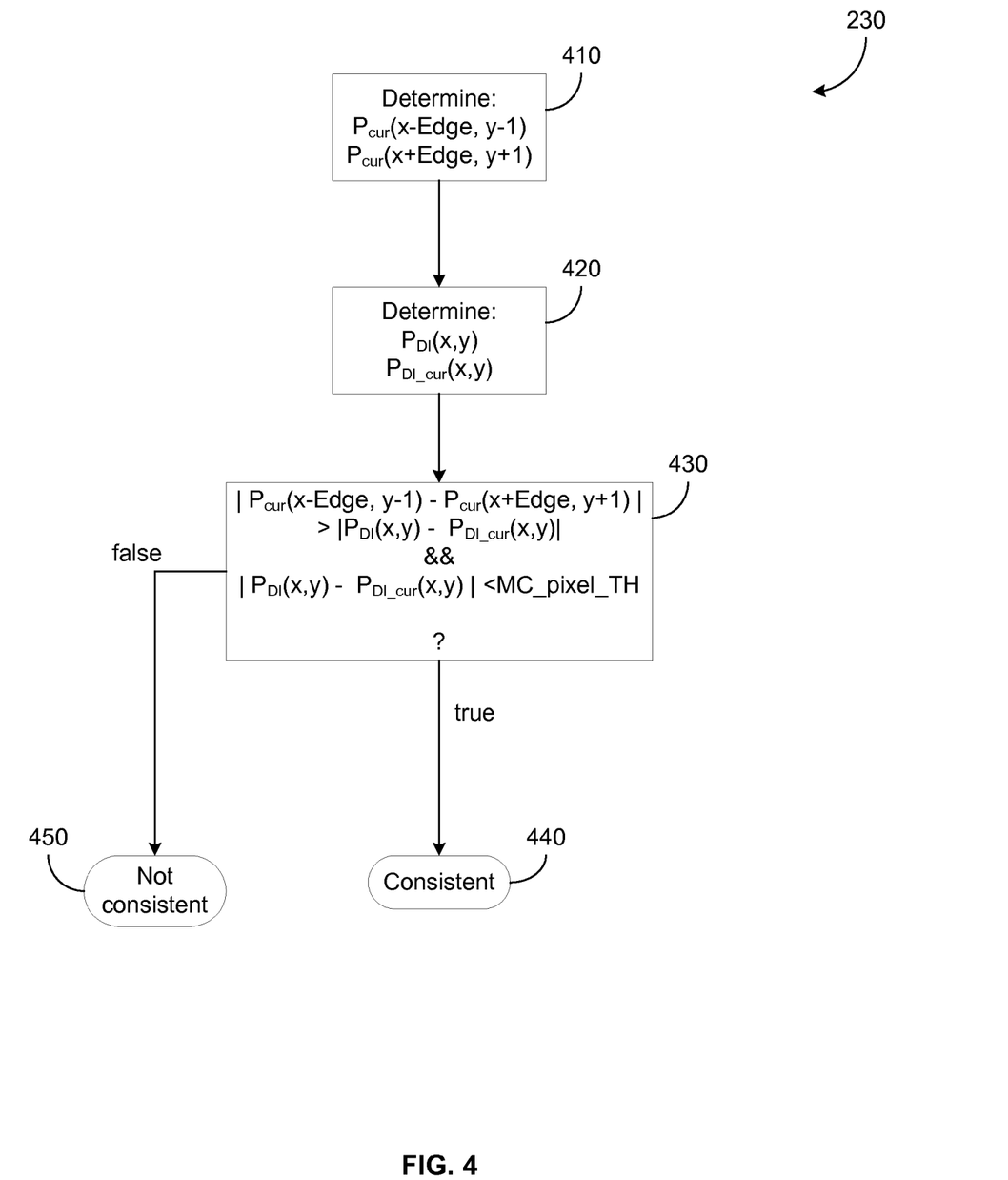
FIG. 4 is a flow chart illustrating the processing of the consistency check, according to an embodiment.

The consistency check 230 is illustrated in greater detail in FIG. 4, according to an embodiment. At 410, the values $P_{cur}(x-\text{Edge}, y-1)$ and $P_{cur}(x+\text{Edge}, y+1)$ may be determined. Edge is an x coordinate an edge of the interlaced frame; $P_{cur}$ is a motion compensation distance based on the motion vector as projected from the indicated coordinates.

At 420, $P_{DI}(x,y)$ and $P_{DI\_cur}(x,y)$ may be determined. $P_{DI}(x,y)$ is a motion compensation distance based on the motion vector as projected to the current pixel in the current frame from the corresponding pixel of the reference frame; $P_{DI\_cur}(x,y)$ is a motion compensation distance based on the motion vector as projected from the current pixel to a location in the opposite field of the current frame.

At 430, the boolean expression $$|P_{cur}(x-\text{Edge}, y-1) - P_{cur}(x+\text{Edge}, y+1)| > |P_{DI}(x, y) - P_{DI\_cur}(x, y)|$$

$$\&\&$$

$$|P_{DI}(x, y) - P_{DI\_cur}(x, y)| < \text{MC\_pixel\_TH}$$

is evaluated, where MC_pixel_TH is a threshold value that may have a default value of 25. If this expression is true, then consistency may be considered present with respect to spatial and temporal interpolations at 440. Otherwise, consistency may be considered absent at 450.

Figure 5:
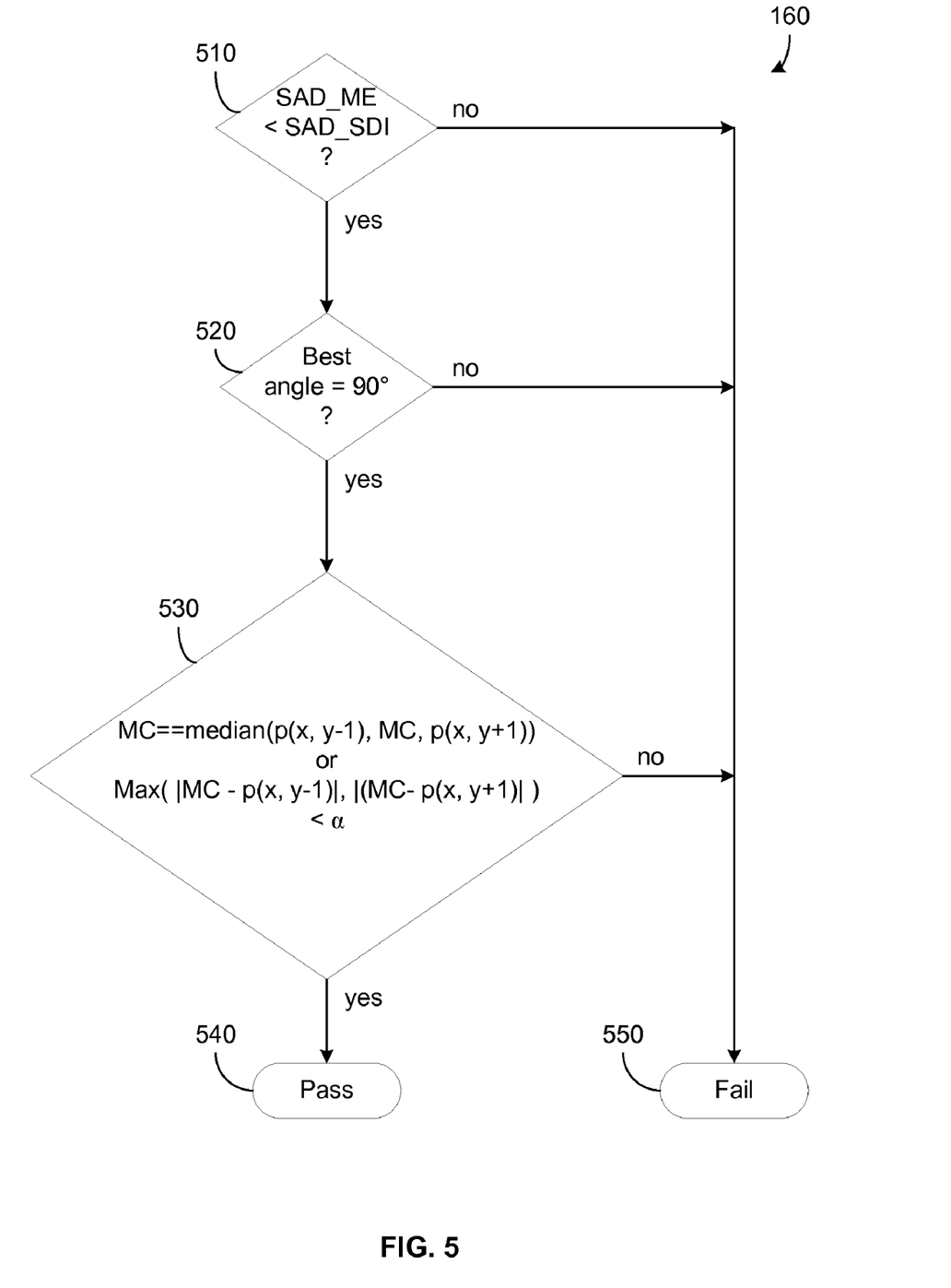
FIG. 5 is a flow chart illustrating supplemental checks, according to an embodiment.

The supplemental checks are shown in FIG. 5, according to an embodiment. For the supplemental checks to be passed as a group, all the checks shown (510-530) must be passed in the embodiment shown. At 510, a determination may be made as to whether the minimal SAD, shown here as SAD_ME, is less than SAD_SDI. The latter value may be based on a best angle for a spatial correlation between successive interlaced frames. A range of possible angles may be considered, and the angle that generates the lowest SAD between the interlaced frames may be the most accurate, or "best" angle, of the angles considered. This lowest SAD may be the value SAD_SDI. If check 510 is not met, then the supplemental checks as a whole may be considered to have failed at 550.

If check 510 is passed, then the process continues to 520. Here, a determination may be made as to whether the best angle is 90°. If not, the supplemental checks as a set may be considered to have failed at 550. Otherwise, the process continues at 530.

Here, either of two conditions may be met to constitute passing this check. The first condition is $$MC = \text{median}(p(x, y-1), MC, p(x, y+1))$$

where MC represents the intensity of the current pixel, and p represents the intensity of the pixel at the designated coordinates. Failing this condition may suggest that an abrupt change in intensity may be present.

The second condition is $$\text{Max}(|MC - p(x, y-1)|, |MC - p(x, y+1)|) < \alpha$$

which may determine whether the difference between the intensities of the current and neighboring pixels is below a threshold $\alpha$. Again, failing this condition may suggest that an abrupt change in intensity may be present.

If either of these conditions is passed in check 530, then check 530 may be passed. At this point, all three checks 510-530 will have passed, so that the supplemental checks as a whole are passed as shown at 540. If both conditions fail, then check 530 fails, and the supplemental checks as a whole may be failed as shown at 550.

The processing described above may be implemented in hardware, firmware, or software, or some combination thereof. In addition, any one or more features disclosed herein may be implemented in hardware, software, firmware, or a combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

A software or firmware embodiment of the processing described above is illustrated in FIG. 6. System 600 may include a programmable processor 625 and a body of memory 610 that may include one or more computer readable media that store computer program logic 615. Memory 610 may be implemented as one or more of a hard disk and drive, a removable media such as a compact disk and drive, or a read-only memory (ROM) device, for example. Processor 625 and memory 610 may be in communication using any of several technologies known to one of ordinary skill in the art, such as a bus. Logic contained in memory 610 may be read and executed by processor 625. One or more I/O ports and/or I/O devices, shown collectively as I/O 620, may also be connected to processor 625 and memory 610.

Figure 6:
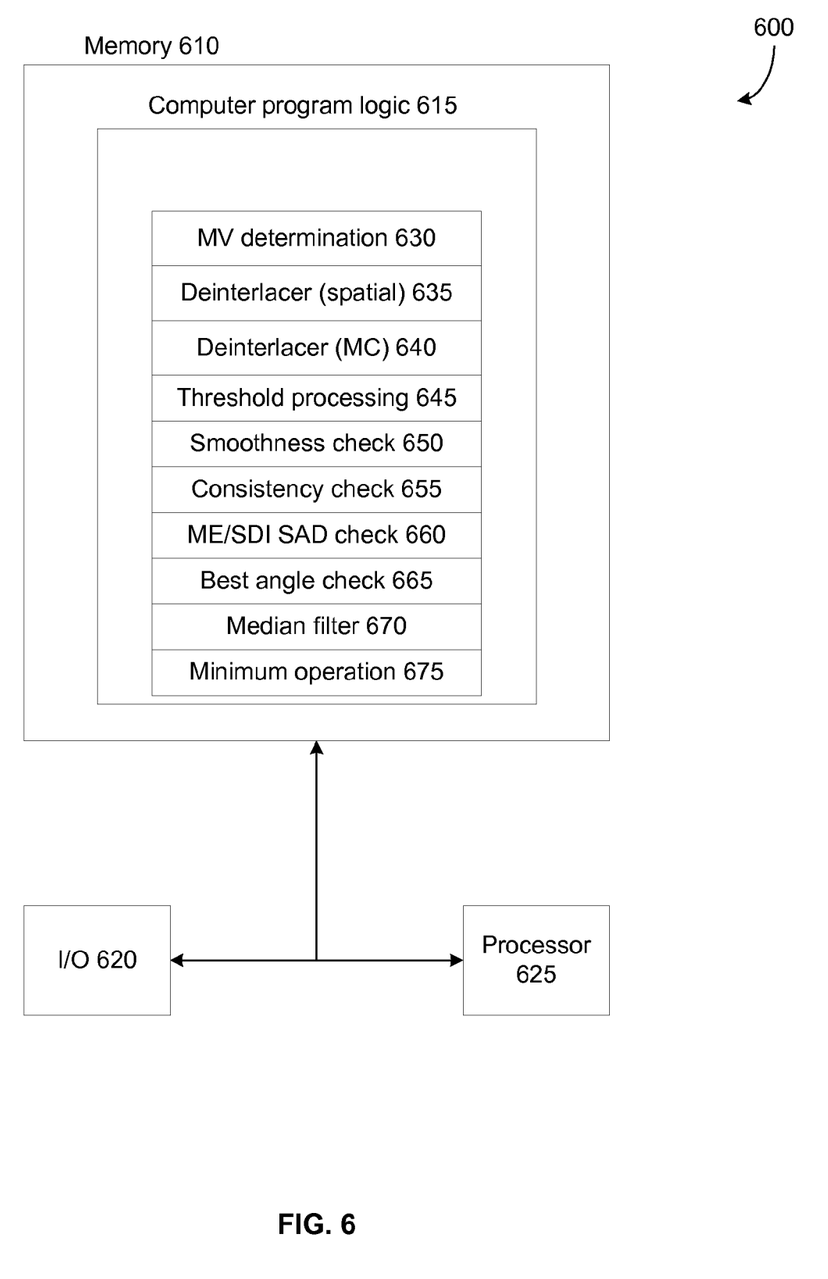
FIG. 6 is a block diagram illustrating processing modules in a software or firmware embodiment.

In an embodiment, computer program logic 615 may include the modules 630-675 shown in FIG. 6, but is not necessarily limited to these modules. The MV determination module 630 may be responsible for determining a motion vector for a current pixel in an interlaced frame. As discussed above, this motion vector may be selected on the basis of its minimal SAD, as calculated according to the equation presented in para. 0013. A spatial deinterlacing module 635 may be responsible for performing deinterlacing using a spatial interpolation value; a motion compensation deinterlacing module 635 may be responsible for performing deinterlacing using a motion compensation interpolation value.

A threshold processing module 645 may be responsible for comparing the minimal SAD to threshold values TH1 and TH2. As discussed above, this comparison contributes to the determination as to whether deinterlacing will be performed using a spatial interpolation value or a motion compensation interpolation value.

A smoothness check module 650 may be responsible for performing the smoothness check as described above. This module may perform the processing illustrated in FIG. 3, in order to determine whether the motion vector of the current pixel varies significantly from the MVs of neighboring pixels. A consistency check module 655 may be responsible for performing the consistency check as described above. This module may perform the processing illustrated in FIG. 4, according to an embodiment, in order to evaluate consistency with respect to spatial and temporal interpolations.

Module 660-675 may be responsible for performing supplemental checks beyond the above smoothness and consistency checks. A SAD check module 660 may be responsible for comparing the minimal SAD value against a SAD value of the current pixel determined on the basis of a best angle in the context of spatial interpolation, as discussed above. A best angle check module 665 may be responsible for determining whether the best angle is 90° as discussed above. A median filter module 670 may be responsible for determining whether the intensity of the current pixel falls between the intensities of neighboring pixels, as described above. A minimum operations module 675 may be responsible for deciding whether the difference between the intensities of the current pixel and neighboring pixels is below a defined threshold.

Alternatively, any of the logic modules shown in computer program logic 615 may be implemented in hardware.

Methods and systems are disclosed herein with the aid of functional building blocks, such as those listed above, describing the functions, features, and relationships thereof. At least some of the boundaries of these functional building blocks have been arbitrarily defined herein for the convenience of the description. Alternate boundaries may be defined so long as the specified functions and relationships thereof are appropriately performed. In addition, the encoder and decoder described above may by incorporated in respective systems that encode a video signal and decode the resulting encoded signal respectively using the processes noted above.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
   determining a minimal sum of absolute differences (SAD) for a pixel in an interlaced frame; and
   comparing the minimal SAD to a first threshold and second threshold value, such that
      when the minimal SAD is less than or equal to the first threshold value, smoothness and consistency checks are performed; and
      when the minimal SAD is greater than the first threshold value and less than or equal to the second threshold value, the smoothness and consistency checks are performed, and supplemental checks are performed,
   wherein the outcome of the smoothness and consistency checks and, when performed, the supplemental checks, determine whether a motion compensation interpolation value or a spatial interpolation value is selected for deinterlacing the interlaced frame;
   wherein said determining and comparing are performed using a processor, and wherein the supplemental checks comprise:
a SAD check;
a best angle check;
a median filtering check; and
a minimum operation check;
wherein passing the SAD and best angle checks, and at least one of the media filtering and the minimum operation checks represents passing the supplemental checks.

2. The method of claim 1, wherein each SAD is calculated according to the following:

$$SAD = \sum_{i=x-w}^{x+w+1} \sum_{j=y-h}^{y+h} |p_{ref}(i+M_x, j+M_y) - p_{curr}(i,j)|$$

where
$p_{ref}$ is an opposite field in a reference field,
$p_{curr}$ is an opposite field in a current field,
$M_x$ and $M_y$ are respective x and y components of an associated motion vector MV,
w is a width of a block, and
h is a height of the block.

3. The method of claim 1, wherein
the first threshold is equal to zero;
the second threshold is greater than or equal to 5 and less than or equal to 10; and
the second threshold is correlated to the textural complexity of the interlaced frame.

4. The method of claim 1, wherein said performance of the smoothness check comprises:
determining a best motion vector MV for each respective pixel neighboring the pixel in the interlaced frame; and
comparing each best MV with a MV associated with the minimal SAD, wherein, when all the comparisons are less than an MV threshold, the smoothness check is passed.

5. The method of claim 1, wherein said performance of the consistency check comprises:
evaluating a logical expression $$|P_{cur}(x - \text{Edge}, y-1) - P_{cur}(x + \text{Edge}, y+1)| >$$
$$|P_{DI}(x, y) - P_{DI\_cur}(x, y)| \; \& \; \&$$
$$|P_{DI}(x, y) - P_{DI\_cur}(x, y)| < \text{MC\_pixel\_TH(default 25)}$$

such that, when true, the consistency check is passed, wherein
Edge is an x coordinate of an edge of the interlaced frame;
$P_c$, is a motion compensation distance based on the motion vector as projected from the indicated coordinates,
$P_{DI}(x,y)$ is a motion compensation distance based on the motion vector as projected to the current pixel in the current frame from the corresponding pixel of the reference frame,
$P_{DI\_cur}(x,y)$ is a motion compensation distance based on the motion vector as projected from the current pixel to a location in the opposite field of the current frame, and MC_pixel_TH is a threshold value having a default value of 25.

6. The method of claim 1, wherein said SAD check comprises:
determining whether the minimal SAD is less than a spatial deinterlacing SAD,
where, when true, the SAD check is passed.

7. The method of claim 1, wherein the best angle check comprises:
determining whether the best angle is 90°,
where, when true, the best angle check is passed.

8. The method of claim 1, wherein
the median filtering check comprises determining whether $$MC = \text{Median}(p(x,y-1), MC, p(x,y+1))$$

is true where, when true, the median filtering check is passed; and
the minimum operation check comprises determining whether $$\text{Min}(abs(MC - p(x,y-1)), abs(MC - p(x,y-1))) < \alpha$$

is true where, when true, the minimum operation check is passed.

9. The method of claim 1, wherein:
when the minimal SAD is greater than the second threshold value, the spatial interpolation value is selected for deinterlacing the interlaced frame;
when the minimal SAD is greater than the first threshold value and less than or equal to the second threshold value, and
the smoothness, consistency, and supplemental checks are passed, the motion compensation interpolation value is selected for deinterlacing the interlaced frame, and
when any of the smoothness, consistency, and supplemental checks fails, the spatial interpolation value is selected for deinterlacing the interlaced frame; and
when the minimal SAD is less than or equal to the first threshold value, and
the smoothness and consistency checks are passed, the motion compensation interpolation value is selected for deinterlacing the interlaced frame, and
when either the smoothness or consistency checks fails, the spatial interpolation value is selected for deinterlacing the interlaced frame.

10. A computer program product including a non-transitory computer readable medium having computer program logic stored therein, the computer program logic including:
logic to cause a processor to determine a minimal sum of absolute differences (SAD) for a pixel in an interlaced frame; and
logic to cause a processor to compare the minimal SAD to a first threshold and second threshold value, such that
when the minimal SAD is less than or equal to the first threshold value, smoothness and consistency checks are performed; and
when the minimal SAD is greater than the first threshold value and less than or equal to the second threshold value, the smoothness and consistency checks are performed, and supplemental checks are performed,
wherein the outcome of the smoothness and consistency checks and, when performed, the supplemental checks, determine whether a motion compensation interpolation value or a spatial interpolation value is selected for de-interlacing the interlaced frame, and
wherein said logic to cause the processor to perform the supplemental checks comprises
logic to cause the processor to perform a SAD check;
logic to cause the processor to perform a best angle check;
logic to cause the processor to perform a median filtering check; and
logic to cause the processor to perform a minimum operation check, wherein passing the SAD and best angle checks, and at least one of the media filtering and the minimum operation checks represents passing the supplemental checks.

11. The computer program product of claim 10, wherein each SAD is calculated according to the following:

$$SAD = \sum_{i=x-w}^{x+w+1} \sum_{j=y-h}^{y+h} |p_{ref}(i+M_x, j+M_y) - p_{curr}(i,j)|$$

where
$p_{ref}$ is an opposite field in a reference field,
$P_{curr}$ is an opposite field in a current field,
$M_x$ and $M_y$ are respective x and y components of an associated motion vector MV,
w is a width of a block, and
h is a height of the block.

12. The computer program product of claim 10, wherein the first threshold is equal to zero;
the second threshold is greater than or equal to 5 and less than or equal to 10; and
the second threshold is correlated to the textural complexity of the interlaced frame.

13. The computer program product of claim 10, further comprising logic to cause the processor to perform the smoothness check, which comprises:
logic to cause the processor to determine the best motion vector MV for each respective pixel neighboring the pixel in the interlaced frame; and
logic to cause the processor to compare each best MV with the motion vector MV associated with the minimal SAD,
wherein, when all the comparisons are less than an MV threshold, the smoothness check is passed.

14. The computer program product of claim 10, further comprising logic to cause the processor to perform the consistency check, comprising:
logic to cause the processor to evaluate a logical expression $|P_{cur}(x - \text{Edge}, y-1) - P_{cur}(x + \text{Edge}, y+1)| >$
$|P_{DI}(x, y) - P_{DI\_cur}(x, y)|$ & &
$|P_{DI}(x, y) - P_{DI\_cur}(x, y)| < \text{MC\_pixel\_TH(default 25)}$ such that, when true, the consistency check is passed, wherein
$P_{cur}$ is a motion compensation distance based on the motion vector as projected from the indicated coordinates,
$P_{DI}$ (x,y) is a motion compensation distance based on the motion vector as projected to the current pixel in the current frame from the corresponding pixel of the reference frame,
$P_{DI\_cur}$ (x,y) is a motion compensation distance based on the motion vector as projected from the current pixel to a location in the opposite field of the current frame, and
MC_pixel_TH is a threshold value having a default value of 25.

15. The computer program product of claim 10, wherein said logic to cause the processor to perform the SAD check comprises:
logic to cause the processor to determine whether the minimal SAD is less than a spatial deinterlacing SAD, where, when true, the SAD check is passed.

16. The computer program product of claim 10, wherein said logic to cause the processor to perform the best angle check comprises:
logic to cause the processor to determine whether the best angle is 90°,
where, when true, the best angle check is passed.

17. The computer program product of claim 10, wherein said logic to cause the processor to perform the median filtering check comprises:
logic to cause the processor to determine whether $MC=\text{Median}(p(x,y-1),MC,p(x,y+1))$ is true where, when true, the median filtering check is passed; and
said logic to cause the processor to perform the minimum operation check comprises logic to cause the processor to determine whether $\text{Min}(abs(MC-p(x,y-1)),abs(MC-p(x,y-1)))<\alpha$ is true where, when true, the minimum operation check is passed.

18. The computer program product of claim 10, wherein said logic to cause a processor to compare the minimal SAD to the first threshold and second threshold value comprises:
logic to cause the processor to select the spatial interpolation value for deinterlacing the interlaced frame, when the minimal SAD is greater than the second threshold value;
logic to cause the processor to select the motion compensation interpolation value for deinterlacing the interlaced frame when the minimal SAD is greater than the first threshold value and less than or equal to the second threshold value, and the smoothness, consistency, and supplemental checks are passed;
logic to cause the processor to select the spatial interpolation value for deinterlacing the interlaced frame when the minimal SAD is greater than the first threshold value and less than or equal to the second threshold value, and when any of the smoothness, consistency, and supplemental checks fails;
logic to cause the processor to select the motion compensation interpolation value for deinterlacing the interlaced frame when the minimal SAD is less than or equal to the first threshold value and the smoothness and consistency checks are passed; and
logic to cause the processor to select the spatial interpolation value for deinterlacing the interlaced frame when the minimal SAD is less than or equal to the first threshold value, and either the smoothness or consistency checks fails.

19. A system, comprising:
a processor; and
a memory in communication with said processor, said memory storing a plurality of processing instructions configured to direct said processor to
determine a minimal sum of absolute differences (SAD) for a pixel in an interlaced frame; and
compare the minimal SAD to a first threshold and second threshold value, such that
when the minimal SAD is less than or equal to the first threshold value, smoothness and consistency checks are performed; and
when the minimal SAD is greater than the first threshold value and less than or equal to the second threshold value, the smoothness and consistency checks are performed, and supplemental checks are performed, wherein the outcome of the smoothness and consistency checks and, when performed, the supplemental checks, determine whether a motion compensation interpolation value or a spatial interpolation value is selected for de-interlacing the interlaced frame, and wherein said processing instructions configured to direct said processor to perform the supplemental checks comprise instructions configured to direct said processor to:

perform a SAD check;
perform a best angle check;
perform a median filtering check; and
perform a minimum operation check;

wherein passing the SAD and best angle checks, and at least one of the media filtering and the minimum operation checks represents passing the supplemental checks.

20. The system of claim 19, wherein each SAD is calculated according to the following:

$$SAD = \sum_{i=x-w}^{x+w+1} \sum_{j=y-h}^{y+h} |p_{ref}(i+M_x, j+M_y) - p_{curr}(i,j)|$$

where
$p_{ref}$ is an opposite field in a reference field,
$P_{curr}$ is an opposite field in a current field,
$M_x$ and $M_y$ are respective x and y components of an associated motion vector MV,
w is the width of a block, and
h is the height of the block.

21. The system of claim 19, wherein
the first threshold is equal to zero;
the second threshold is greater than or equal to 5 and less than or equal to 10; and
the second threshold is correlated to the textural complexity of the interlaced frame.

22. The system of claim 19, wherein said memory further stores processing instructions configured to direct said processor to perform the smoothness check, where said processing instructions configured to direct said processor to perform the smoothness check comprise instructions configured to direct said processor to:
determine the best motion vector MV for each respective pixel neighboring the pixel in the interlaced frame; and
compare each best MV with the motion vector MV associated with the minimal SAD, wherein, when all the comparisons are less than an MV threshold, the smoothness check is passed.

23. The system of claim 19, wherein said memory further stores processing instructions configured to direct said processor to perform the consistency check, said processing instructions configured to direct said processor to perform the consistency check comprising instructions configured to direct said processor to:
evaluate a logical expression $|P_{cur}(x - \text{Edge}, y-1) - P_{cur}(x + \text{Edge}, y+1)| >$ $\quad |P_{DI}(x,y) - P_{DI\_cur}(x,y)| \;\&\;\&$ $\quad |P_{DI}(x,y) - P_{DI\_cur}(x,y)| < \text{MC\_pixel\_TH(default 25)}$ such that, when true, the consistency check is passed, wherein
$P_{cur}$ is a motion compensation distance based on the motion vector as projected from the indicated coordinates,
$P_{DI}(x,y)$ is a motion compensation distance based on the motion vector as projected to the current pixel in the current frame from the corresponding pixel of the reference frame,
$P_{DI\_cur}(x,y)$ is a motion compensation distance based on the motion vector as projected from the current pixel to a location in the opposite field of the current frame, and
MC_pixel_TH is a threshold value having a default value of 25.

24. The system of claim 19, wherein said instructions configured to direct said processor to perform the SAD check comprises instructions configured to direct said processor to:
determine whether the minimal SAD is less than a spatial deinterlacing SAD, where, when true, the SAD check is passed.

25. The system of claim 19, wherein said instructions configured to direct said processor to perform the best angle check comprises instructions configured to direct said processor to:
determine whether the best angle is 90°,
where, when true, the best angle check is passed.

26. The system of claim 19, wherein
said instructions configured to direct said processor to perform the median filtering check comprises instructions configured to direct said processor to determine if $MC = \text{Median}(p(x,y-1), MC, p(x,y+1))$ is true where, when true, the median filtering check is passed; and
said instructions configured to direct said processor to perform the minimum operation check comprises instructions configured to direct said processor to determine if $\text{Min}(abs(MC - p(x,y-1)), abs(MC - p(x,y-1)) < \alpha$ is true where, when true, the minimum operation check is passed.

27. The system of claim 19, wherein said instructions configured to direct the processor to compare the minimal SAD to the first threshold and second threshold value comprises instructions configured to direct the processor to:
select the spatial interpolation value for deinterlacing the interlaced frame, when the minimal SAD is greater than the second threshold value;
select the motion compensation interpolation value for deinterlacing the interlaced frame when the minimal SAD is greater than the first threshold value and less than or equal to the second threshold value, and the smoothness, consistency, and supplemental checks are passed;
select the spatial interpolation value for deinterlacing the interlaced frame when the minimal SAD is greater than the first threshold value and less than or equal to the second threshold value, and when any of the smoothness, consistency, and supplemental checks fails;
select the motion compensation interpolation value for deinterlacing the interlaced frame when the minimal SAD is less than or equal to the first threshold value and the smoothness and consistency checks are passed; and
select the spatial interpolation value for deinterlacing the interlaced frame when the minimal SAD is less than or equal to the first threshold value, and either the smoothness or consistency checks fails.

* * * * *